United States Patent

Briles

[15] 3,682,508

[45] Aug. 8, 1972

[54] RE-USABLE, SPIN-STOPPING FASTENER

[72] Inventor: Franklin S. Briles, No. 6 Middle Ridge Lane, Rolling Hills, Calif. 90274

[22] Filed: Nov. 19, 1969

[21] Appl. No.: 878,135

[52] U.S. Cl. .......................287/189.36 F, 151/41.73
[51] Int. Cl. ..............................................F16b 5/02
[58] Field of Search...151/41.73; 287/189.36 F; 85/1

[56] References Cited

UNITED STATES PATENTS

| | | | |
|---|---|---|---|
| 2,685,320 | 8/1954 | Rosan | 151/41.73 |
| 2,697,873 | 12/1954 | Cooke | 287/189.36 F |
| 3,418,012 | 12/1968 | La Torre | 287/189.36 F |
| 3,390,906 | 7/1968 | Wing | 287/189.36 F |

FOREIGN PATENTS OR APPLICATIONS 500,583   3/1954   Canada....................151/41.73

*Primary Examiner*—Edward C. Allen
*Attorney*—White & Haefliger

[57] ABSTRACT

A tightenable fastening assembly capable of re-tightening, without auxiliary retention against rotation in an initially non-tapered bore formed in work structure, comprises
  a. a fastener head and shank, the shank defining first, second and third sections in a lengthwise direction away from the head,
  b. the second section having a uniform diameter along its length which is sufficient in relation to the bore diameter to provide slight piloting interference with the work when the fastener is inserted in the bore, the second section sized to protrude from the bore when the fastener head engages one side of the work,
  c. the third section adapted to protrude from the work and being threaded to receive a nut so that the nut may engage the opposite side of the work and tighten thereagainst, and
  d. the first section being tapered away from the head toward the second section and being sufficiently oversized in relation to the bore diameter that frictional interference force develops to prevent rotation of the fastener shank in the hole in response to said nut tightening acting to draw said head toward said one side of the work.

2 Claims, 3 Drawing Figures

INVENTOR.
FRANKLIN S. BRILES
By White & Haefliger
Attorneys.

RE-USABLE, SPIN-STOPPING FASTENER

BACKGROUND OF THE INVENTION

This invention relates generally to fasteners, and more particularly concerns nut and bolt type fasteners having interference fit with structural members.

In the past, tapered pin fasteners have been used in work passages which were tapered; however, the drilling of tapered holes presents problems and is generally objectionable as being too costly. Another problem which exists both where tapered pins are designed for reception in tapered openings, and also where straight fastener shanks are received in non-tapered holes is that of fastener rotation in the hole as the nut is tightened on the shank thread and against the work. Such rotation, if not stopped, often prevents nut tightening to predetermined torque levels necessary for safety or strength considerations. In an effort to solve the rotation problem, the ends of fastener shanks have been broached or otherwise recessed to receive tools to hold the shank against rotation during nut tightening; however, such recesses trap foreign particles and contaminants in use, and thus introduce problems in certain installations such as tanks, etc. Also, certain nuts incorporated on such recessed end fasteners are designed with tightening heads that shear off when predetermined torque is reached, preventing re-tightening of the nuts after torque decrease for whatever reason, as well as re-use.

SUMMARY OF THE INVENTION

It is a major object of the present invention to provide solutions to the above described problems through the provision of an unusually advantageous fastener assembly characterized as re-tightenable; non-slipping in a rotary direction during tightening and re-tightening; lacking need for retaining-tool receiving recesses in the fastener shank end; and as being re-usable.

Basically, the invention is embodied in a fastener and nut assembly that comprises a fastener head and shank, the latter having first, second and third sections in a lengthwise direction away from the head; the second section having a uniform diameter along its length which is sufficient in relation to the hole or bore diameter to provide slight piloting interference with the work when the fastener is inserted in the hole, the second section sized to protrude from the hole when the fastener head engages one side of the work; the third section adapted to protrude from the work and being threaded to receive the nut so that the latter may engage and tighten against the opposite side of the work; and the first section being tapered away from the head toward the second section and being sufficiently oversized in relation to the hole diameter that frictional interference force develops to prevent rotation of the shank in the hole in response to nut tightening acting to draw the head toward the work. Typically, the sum of the lengths of the first and second sections, that provide piloting, grip, and resistance to spinning or rotation of the shank, is within the range from about ⅛ to ½ inch. Further, the work structure may typically comprise multiple panels with a flowable bonding agent between them proximate the hole, the nut being re-tightenable to predetermined torque level as the tension in the shank decreases due to creep or flowing of the bond under compression between the panels, all without rotation of the fastener shank and without need of auxiliary tooling to keep the shank from so rotating.

Additional features of the invention contributing to unusually advantageous results include the provision of first section taper of approximately 0.250 inches per foot of length; the provision of initial interference between the piloting second section and the hole diameter of between 0.0006 and 0.0036 inch; and the provision of maximum interference between the tapered first section and hole diameter of approximately 0.007 inch. Accordingly, drilling of a tapered hole is not necessary to realize the benefits of the invention, a straight hole being sufficient. In addition, the fastener may consist of titanium alloy, having attendant advantages of strength and light weight.

These and other objects and advantages of the invention, as well as the details of an illustrative embodiment, will appear in the following description and drawings, in which:

DRAWING DESCRIPTION

DETAILED DESCRIPTION

Figure 1:
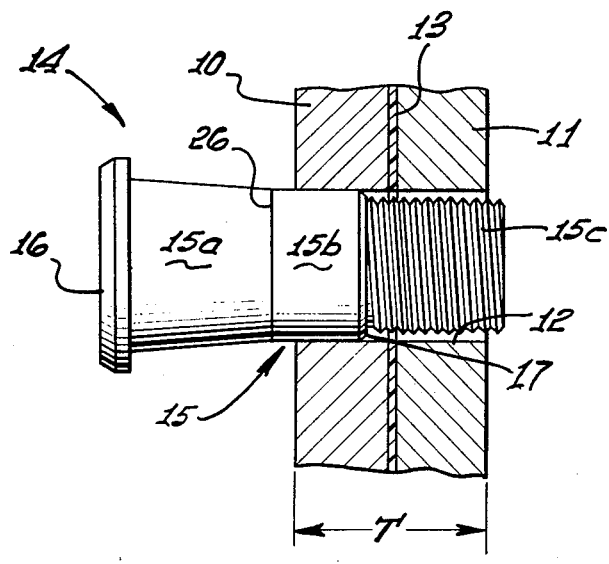
FIG. 1 is an elevation, taken in section, showing initial insertion of a fastener shank, incorporating the invention, into a workpiece.
Figure 2:
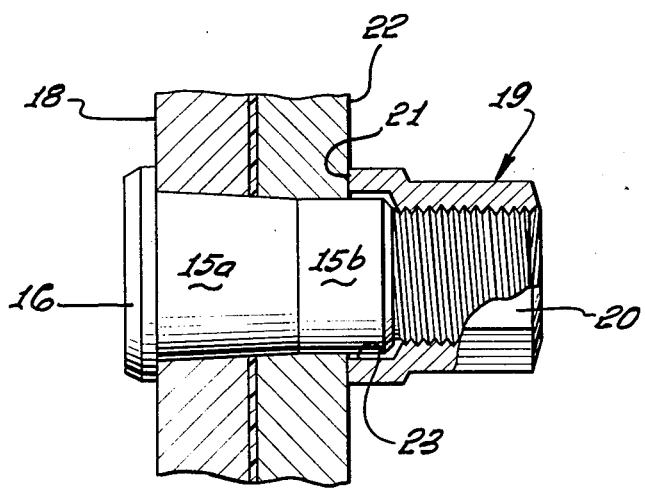
FIG. 2 is a view like FIG. 1, but showing completed insertion and tightening of the FIG. 1 fastener.

Referring first to FIGS. 1 and 2, the work structure illustrated includes two panels 10 and 11 into which a straight, i.e. non-tapered cylindrical bore 12 has been drilled or otherwise formed. A suitable bonding or sealing agent may, as an example, be applied to at least one panel face so as to form the thin layer 13 when the panels are assembled together to be fastened by the assembly 14 to be described. The agent may, for example, comprise a resinous compound such as epoxide or other resin. Although partly or completely cured, it may tend to creep or flow so as to reduce the thickness of the layer under compression, it then becoming necessary to re-tighten the fastener assembly in order to maintain predetermined tension levels in the fastener shank 15, or nut torque levels, to meet design or operating requirements, as in aircraft tanks.

The fastener has a head 16, from which the shank 15 extends lengthwise in three sections 15a, 15b and 15c. The second section 15b has a uniform diameter throughout its length between terminals 26 and 17, which diameter is sufficient in relation to the hole diameter to provide slight piloting interference with the work when the fastener is inserted in the hole as shown in FIG. 1. For fastener "grip" lengths between ⅛ and ½ inch (the grip length being the sum of the lengths of sections 15a and 15b), such interference should be between 0.0006 and 0.0036 inch for best results. In this regard the hole or bore diameter is less than the grip length. Further, the grip length is typically greater than the overall thickness dimension T of the work structure, so that the second section 15b protrudes somewhat from the hole when the fastener head 16 engages one side 18 of the work, as appears in FIG. 2.

The third shank section 15c also protrudes from the work in FIG. 2, and is externally threaded, with crest diameter less than the diameter of section 15b, to receive a nut 19. The latter may have wrench flats 20 for reception of a tightening tool or wrench operable to tighten the nut end 21 against the opposite side 22 of the work. The nut is typically counterbored as at 23 to receive the protruding end of the piloting section 15b of the shank, without interrupting tightening and re-tightening of the nut when necessary.

The first shank section 15a is slightly tapered in a direction away from the head 26 and ending at terminal 16 to be sufficiently and progressively oversized in relation to the hole diameter that frictional interference force is developed in FIG. 2 to prevent rotation of the fastener shank in the hole while the shank is pulled toward FIG. 2 configuration in response to tightening of the nut.

Note that the fastener section 15c is not so long as to protrude from the nut in FIG. 2; on the other hand, it together with pilot section 15b are of sufficient length that the nut may be assembled onto the end of the section 15c so that the nut threads interfit the section threads when the shank 15 is initially pushed fully into the hole to engage the taper of section 15a with the bore 12, without compressively deforming (i.e. expanding) that bore. Thereafter, as the nut is tightened, the shank tapered section 15a is drawn into the bore to produce the increasing interference force preventing rotation of the shank during increasing tightening of the nut. In this regard, the maximum diameter of the tapered section proximate the head 15a should, for best results, be about 0.0007 inch greater than the initial, i.e. undeformed, diameter of the bore 12, particularly for grip lengths between ⅛ and ½ inch. Also, the taper of section 15a should be about 0.250 inches per foot.

Accordingly, the fastener assembly is re-usable since the nut can be removed and the taper of section 15a is so slight as not to become scored; or the nut can be re-tightened to develop desired torque levels after the bond or sealant 13 has deformed to reduce the tension in the fastener shank and the tightening torque.

Figure 3:
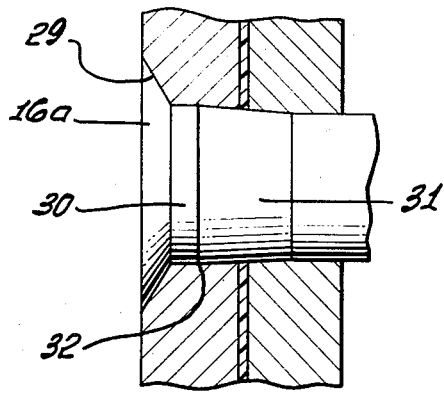
FIG. 3 is a fragmentary elevation showing a modified fastener head.

Finally, the fastener assembly may consist of titanium alloy (for example Beta III) for maximum strength with light weight, or stainless steel; and the head of the fastener may be tapered as at 16a in FIG. 3, in which case it seats in a pre-formed tapered counterbore 29 in the work. If desirable or necessary, the nut may be removed, and the fastener disconnected from the work, for re-use in another installation. Panels 10 and 11 may typically consist of titanium or aluminum alloy, stainless steel, or other suitable materials.

FIG. 3 also shows the provision of a short, straight, i.e. non-tapered section 30 on the fastener shank between the taper 31 and head. Section 30 has the same diameter as the largest diameter of the taper at 32.

I claim:
1. In a tightenable fastening assembly capable of being re-tightened, without auxiliary retention against rotation in an initially non-tapered bore formed in work structure that includes multiple panels and a flowable bond at the interface therebetween, the combination with said work structure comprising
   a. a fastener head and shank, the shank defining first, second and third sections in a lengthwise direction away from the head,
   b. the second section having a uniform diameter along its length which diameter is sufficiently larger than the bore diameter to provide slight piloting interference with the work when the fastener is inserted in the bore, said second section diameter exceeding the bore diameter by an amount within the range 0.0006 to 0.0036 inch, the second section sized to remain in and protrude from the bore when the fastener head engages one side of the work, the second section having a nose tapering toward the third section which is of lesser diameter than the second section so as not to interfere with the bore diameter upon said insertion.
   c. the third section protruding from the work and being threaded to receive a nut so that the nut may engage the opposite side of the work and tighten thereagainst, the nut being recessed to receive the end of the second section also protruding from the work, the nut being re-tightenable to predetermined torque level as the tension in the shank decreases due to flowage of the bond, and
   d. the first section being tapered away from the head toward the second section and being sufficiently oversized in relation to the bore diameter that frictional interference force develops to prevent rotation of the fastener shank in the hole in response to said nut tightening acting to draw said head toward said one side of the work, the tapered length of the first section exceeding the length of the second section and said taper being about 0.250 inches per foot of section length, the maximum diameter of the first section along the tapered length thereof exceeding the initial bore diameter by about 0.0007 inch, the sum of the lengths of the first and second sections being within the range from about ⅛ inch to about ½ inch, and the overall length of the second and third sections being sufficient that the nut thread interfits the third section thread when the first section taper initially engages the work bore without compressively deforming same.

2. The combination of claim 1 wherein the fastener shank consists of titanium alloy.

* * * * *